(12) United States Patent
Almgren et al.

(10) Patent No.: US 9,054,788 B2
(45) Date of Patent: Jun. 9, 2015

(54) FREQUENCY HOPPING SCHEME FOR OFDMA SYSTEM

(71) Applicant: TELEFONAKTIEBOLAGET L M ERICSSON (PUBL), Stockholm (CH)

(72) Inventors: Magnus Almgren, Sollentuna (SE); Henrik Nyberg, Stockholm (SE); Per Skillermark, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/017,769

(22) Filed: Sep. 4, 2013

(65) Prior Publication Data

US 2014/0003467 A1    Jan. 2, 2014

Related U.S. Application Data

(62) Division of application No. 12/528,027, filed as application No. PCT/SE2007/050110 on Feb. 2, 2007, now Pat. No. 8,681,717.

(51) Int. Cl.
| | |
|---|---|
| *H04W 4/00* | (2009.01) |
| *H04B 1/713* | (2011.01) |
| *H04B 1/7143* | (2011.01) |
| *H04L 5/00* | (2006.01) |
| *H04L 27/26* | (2006.01) |

(52) U.S. Cl.
CPC .............. *H04B 1/713* (2013.01); *H04B 1/7143* (2013.01); *H04L 5/0007* (2013.01); *H04L 5/0037* (2013.01); *H04L 5/0064* (2013.01); *H04L 27/2601* (2013.01)

(58) Field of Classification Search
CPC ....................................................... H04B 1/713
USPC ........................................................ 370/329
See application file for complete search history.

(56) References Cited

U.S. PATENT DOCUMENTS 8,274,880 B2     9/2012   Zhang et al.

FOREIGN PATENT DOCUMENTS

| WO | 9919993 A1 | 4/1999 |
|---|---|---|
| WO | 2006102744 A1 | 10/2006 |

OTHER PUBLICATIONS

Stamatiou et al. "A Performance Analysis of Coded Frequency-Hopped OFDMA." 2005 IEEE Wireless Communications and Networking Conference, vol. 2, pp. 1132-1137, Mar. 13-17, 2005.
Kurt et al. "On Symbol Collisions in FH-OFDMA." 2004 IEEE 59th Vehicular Technology Conference (VTC 2004-Spring), vol. 4, pp. 1859-1863, Spring 2004.
Jung et al. "Random FH-OFDMA System Based on Statistical Multiplexing." 2005 IEEE 61st Vehicular Technology Conference (VTC 2005-Spring), vol. 3, pp. 1793-1797, Spring 2005.

(Continued)

*Primary Examiner* — Shripal Khajuria
(74) *Attorney, Agent, or Firm* — Coats & Bennett, PLLC

(57) ABSTRACT

Available bandwidth is divided into multiple sub-channels, and respective sub-bands containing one or more of these sub-channels are allocated to one or more users. A first frequency allocation is determined, and mathematical operators are used to determine at least one further frequency allocation from the first frequency allocation. A frequency hopping sequence is then determined, including the first frequency allocation, and the or each further frequency allocation. A network node may perform the allocation method, and a user equipment may operate using the allocated bandwidth.

5 Claims, 6 Drawing Sheets

(56) References Cited

OTHER PUBLICATIONS

3rd Generation Partnership Project. "Frequency Hopping Pattern for EUTRA Uplink." R1-070875, TSG-RAN WG1#48, pp. 1-4, St. Louis, Missouri, US, Feb. 12-16, 2007.

3rd Generation Partnership Project. "Multiple Continuous RB Allocation Frequency Hopping in E-UTRAN Uplink." R1-070203, TSG-RAN WG1#47bis, pp. 1-7, Sorrento, Italy, Jan. 15-19, 2007.

3GPP TSG-RAN WG1 #48, R1-070680, ZTE, RB Resource Frequency Hopping in E-UTRAN Uplink, St. Louis, USA, Feb. 12-16, 2007, XP050104715 (retrieved on Feb. 6, 2007), pp. 1-13.

FREQUENCY HOPPING SCHEME FOR OFDMA SYSTEM

This application is a divisional filing of pending U.S. patent application Ser. No. 12/528,027, filed Aug. 20, 2009. This application claims priority to PCT Application PCT/SE2007/050110, filed Feb. 2, 2007.

BACKGROUND OF THE INVENTION

This invention relates to a communication system, and in particular to an orthogonal frequency division multiple access (OFDMA) communication system, in which each user has a frequency hopping scheme.

In an OFDMA system, the available frequency bandwidth is divided into a number of sub-channels, and these sub-channels can be allocated to different users of the system.

The document 3GPP 25.814 "Physical Layer Aspects for Evolved UTRA" v1.2.0 section 9.2.1, describes an uplink access scheme, in which each user can be allocated a variable bandwidth, formed from a number of contiguous sub-channels.

It is known that allowing frequency hopping is a way to improve the reliability of a communication system. That is, when a user is transmitting on one frequency at any given time, there is defined a sequence of frequency channels, and the user transmits on the channels of the defined sequence in turn.

However, this type of technique cannot be straightforwardly applied to a system in which variable bandwidths, and hence variable numbers of sub-channels, can be allocated to the different users, as it is a requirement that the same sub-channel should not be allocated to two different users at the same time. Moreover, it is also advantageous for the sub-channels allocated to each user to be consecutive.

Document 3GPP TSG-RAN WG1 #47BIS, Vol:R1-070203, Nr:47bis "Multiple Continuous RB Allocation Frequency Hopping in E-UTRAN Uplink" discloses a frequency hopping sequence based on Latin Square.

Document WO2006102744 discloses allocating sub-band channels wherein the sub-band channels may be divided into a tree structure.

SUMMARY OF THE INVENTION

According to a first aspect of the present invention, there is provided a method of allocating available bandwidth to one or more users.

According to other aspects of the invention, there are provided a network node, for performing the allocation method, and a user equipment, for operating on the allocated bandwidth.

BRIEF DESCRIPTION OF DRAWINGS

For a better understanding of the present invention, and to show how it may be put into effect, reference will now be made, by way of example, to the accompanying drawings, in which.

DETAILED DESCRIPTION OF EMBODIMENTS

Figure 1:
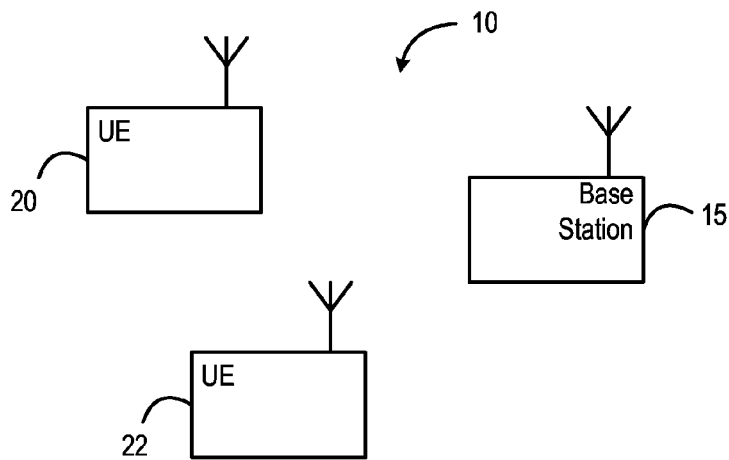
FIG. 1 is a block schematic diagram of a communications system in accordance with an aspect of the present invention.

FIG. 1 illustrates a part of a communication system 10, in which a base station 15 is in wireless communication with first and second user equipments (UEs) 20, 22 respectively.

It will be apparent to the person skilled in the art that the illustrated part of the communication system 10 may form part of a cellular wireless communication system, in which multiple base stations provide coverage to mobile user equipments within a network coverage area.

Figure 2:
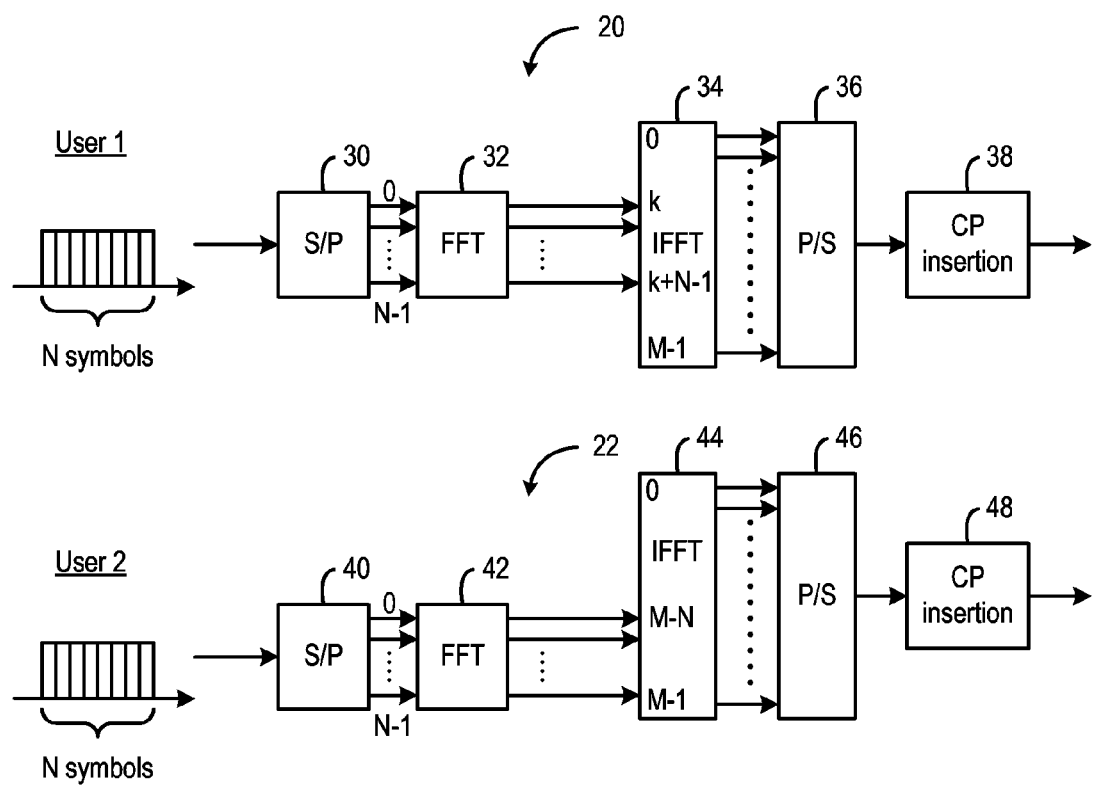
FIG. 2 is a schematic diagram, illustrating the allocation of frequency sub-channels to users in a multiple access system.

FIG. 2 illustrates the operation of one part of the communication system 10, in accordance with an embodiment of the present invention. Specifically, FIG. 2 illustrates parts of the first and second user equipments (UEs) 20, 22 respectively.

Within the first user equipment (UE) 20, data is generated in a conventional manner for transmission over a wireless communications link to the base station 15. In this illustrated case, N symbols of data are generated within one time period. The data is passed to a serial-parallel conversion block 30, where it is converted to parallel form, and then passed over N parallel lines numbered 0, 1, . . . , N−1 to a fast fourier transform (FFT) processing block 32, in which the data is transformed into the frequency domain.

The FFT output data is then passed to N contiguous inputs of an inverse fast fourier transform (IFFT) processing block 34, and converted back into a time domain signal. The IFFT output is then applied to a parallel-serial converter 36, for conversion into a serial data signal, and this signal is then applied to a cyclic prefix (CP) insertion block 38, for the addition of a cyclic prefix, in a manner that is known to the person skilled in the art.

Similarly, within the second user equipment (UE) 22, data is generated in a conventional manner for transmission over a wireless communications link to the base station 15. In this illustrated case, N symbols of data are generated within one time period. The data is passed to a serial-parallel conversion block 40, where it is converted to parallel form, and then passed over N parallel lines numbered 0, 1, . . . , N−1 to a fast fourier transform (FFT) processing block 42, in which the data is transformed into the frequency domain.

The FFT output data is then passed to N contiguous inputs of an inverse fast fourier transform (IFFT) processing block 44, and converted back into a time domain signal. The IFFT output is then applied to a parallel-serial converter 46, for conversion into a serial data signal, and this signal is then applied to a cyclic prefix (CP) insertion block 48, for the addition of a cyclic prefix.

It will thus be noted that, in this illustrated case, each of the two users is transmitting N symbols of data, and this data is mapped to respective groups of N contiguous inputs of the respective IFFT processing blocks 34, 44. In embodiments of the present invention, however, there may be more than two users, and the users may be transmitting different numbers of symbols of data per symbol period.

The respective groups of inputs of the respective IFFT processing blocks 34, 44, to which the data is mapped, correspond to the frequency sub-channels that have been allocated to that user. This allocation is performed in the network, for example in the base station 15, and the respective user equipments ensure that transmissions therefrom use the allocated sub-channels.

Thus, FIG. 2 shows a situation where there are M frequency sub-channels, 0, 1, . . . , M−1, available for transmissions from the user equipments. In this illustrated situation, at the particular symbol period illustrated, the first UE 20 has been allocated a first sub-band, including the N sub-channels k, k+1, k+N−1, while the second UE 22 has been allocated a second sub-band, including the N sub-channels M−N, M−N+1, . . . , M−1. These sub-bands are disjoint, that is, there is no sub-channel that is in both sub-bands, because M−N>k+N−1.

As mentioned above, it would be advantageous to provide a system where a user is able to transmit on different sub-bands during different symbol periods.

Figure 3:
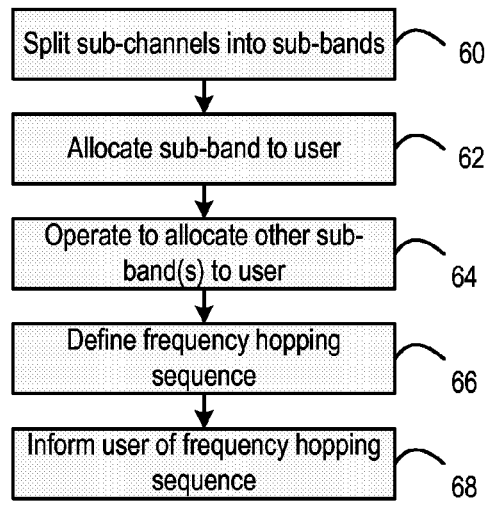
FIG. 3 is a flow chart, illustrating a method in accordance with an aspect of the present invention.

FIG. 3 is a flow chart illustrating a method for allocating a hopping sequence of frequency sub-channels to a user. This method may be performed in the base station 15, or may be performed in any other node that can communicate the result to the base station and the user equipments, and may be performed each time a new user begins transmissions, or, for example, in each time period.

In step 60, the available sub-channels are split into equally sized sub-bands at different levels.

In step 62, one of these sub-bands is allocated to a user, based on the bandwidth required by that user. At this stage, it is possible that the user requires the whole of the available bandwidth, in which case frequency hopping is not possible, and the remaining steps are not performed.

In step 64, at least one other sub-band is allocated to the user, with the other sub-band(s) being defined by means of a mathematical operator being applied to the first allocated sub-band.

In step 66, a frequency hopping sequence is defined, in which the allocated sub-bands are formed into a sequence.

In step 68, the user is informed of the defined frequency hopping sequence, which it should use for its future transmissions.

Figure 4:
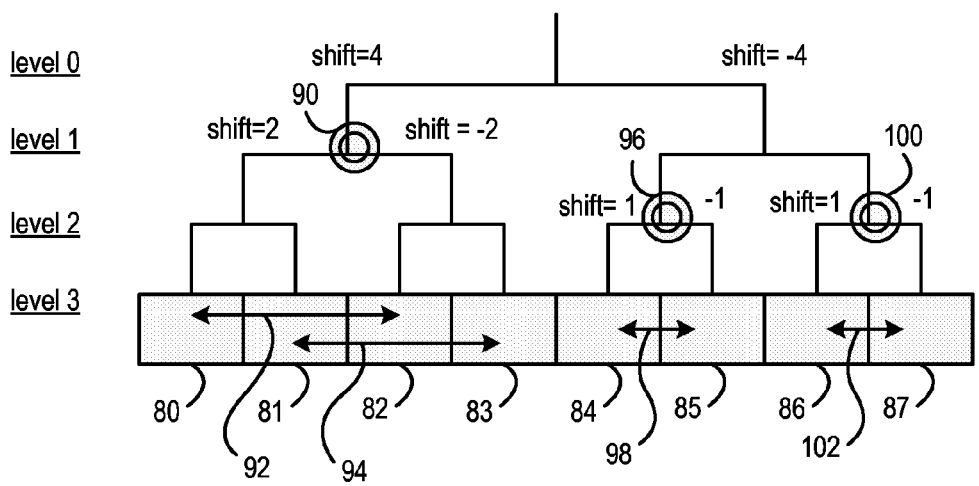
FIG. 4 illustrates in more detail a part of the method of FIG. 3.

These steps will now be described in more detail. FIG. 4 illustrates the way in which the available sub-channels can be split into equally sized sub-bands at different levels. Specifically, FIG. 4 illustrates a leveled binary splitting being performed on the available bandwidth, in order to divide it into equally sized sub-bands. At level k=1, the carrier is split into 2 sub-bands. At an arbitrary level k, the carrier is split into $2^k$ sub-bands, each numbered as 0, 1, . . . , $2^k-1$. Thus, as shown in FIG. 4, there are eight sub-bands 80, 81, 82, . . . , 87 at level k=3. Each of these sub-bands includes one eighth of the total number of sub-channels. The bandwidth can be divided to any required number of levels, such that the number of sub-channels in a sub-band at the lowest level (that is, the highest value of k for which the division is performed) becomes the smallest number of sub-channels that can be allocated to a user.

Let sub-band j at level k be denoted by the binary representation:

$$f_j^{(k)} = b_1 b_2 K b_k$$

so that:

$$b_1 2^{k-1} + b_2 2^{k-2} + K + b_{k-1} 2^1 b_k = j$$

and where $b_i$=0 or 1.

As discussed with reference to step 62 of the process shown in FIG. 3, respective sub-bands are now allocated to the different users. Thus, in FIG. 4, a level 2 sub-band is allocated to a first user. It will be apparent that a level 2 sub-band is equivalent to two level 3 sub-bands, and hence the first and second level 3 sub-bands 80, 81 are allocated to the first user.

At the same time, a level 3 sub-band, specifically the sixth level 3 sub-band 85, is allocated to a second user, and another level 3 sub-band, specifically the seventh level 3 sub-band 86, is allocated to a third user.

Now, introduce the basic "flip" operator $\sigma_i$, acting on level i, by:

$$\sigma_i f_j^{(k)} = f_j^{(k)} \oplus 1_j^{(k)}.$$

in which ⊕ denotes bitwise addition modulo 2 (i.e. the binary exclusive-or operation) and where $1_j^{(k)} := 2^{k-i}$.

As an example:

with $f_{25}^{(6)} = 011001$ we get $\sigma_3 f_{25}^{(6)} = 011001 \oplus 001000 = 010001$.

Note that repeated flip operation retrieves the original sub-band, i.e.

$$\sigma_i^2 := \sigma_i \sigma_i = I,$$

where I is the identity operator, and so, in addition, we can define:

$$\sigma_i^0 := I.$$

Thus, the flip operator acting on sub-band 0 (000 in binary representation) at level 3 generates the new sub-band 1 (001 in binary representation). Meanwhile, the flip operator acting on sub-band 1 (001 in binary representation) at level 3 generates the new sub-band 0 (000 in binary representation). This means that, if the sub-bands 0 and 1 are allocated to different users, this operate will exchange, or flip, those allocations.

Associated with the flip operator $\sigma_i$ acting on level i is a shift $0_i^{(k)}$ at level k such that sub-band j is shifted to sub-band j' with the magnitude of the shift $|j'-j|=2^{k-i}$. Expressed more formally, the flip results in a shift to $$\sigma_i f_j^{(k)} = f_{j'}^{(k)} \text{ where } j' = j + \theta_i^{(k)}(j)$$

with $\theta_i^{(k)}(j) = s(i, k; j) \cdot d(k, i)$, $s(i, k; j) = (-1)^{[j / d(k,i)]}$ is the sign of the shift, and $d(k, i) = 2^{k-i}$ is the magnitude of the shift.

The argument j is the current sub-band and it determines whether the shift is positive or negative.

This means that sub-band j on level k is shifted to sub-band $j' = j + 2^{k-i}$ if $j < 2^{k-i}$ and $j' = j - 2^{k-i}$ otherwise.

Thus, FIG. 4 shows a situation where there is a level 2 sub-band, including the first and second sub-bands 80, 81 on level 3. This can be considered as the first sub-band on level 2. The flip operation therefore acts on level 2, resulting in a shift of one sub-band at level 2, so that the shifted sub-band is the second sub-band on level 2, including the third and fourth sub-bands 82, 83 on level 3. This change is represented in FIG. 4 by a flip indicated by the circle 90, and by the shifts indicated by the arrows 92, 94.

The level 2 sub-band therefore occupies one quarter of the total bandwidth, specifically the lower half of the lower half of the available sub-channels. After the mathematical flip, or shift, operation, there is defined a new sub-band, again occupying one quarter of the total bandwidth, specifically now the upper half of the lower half of the available sub-channels.

FIG. 4 also shows a situation of the sixth level 3 sub-band 85. The flip operation therefore acts on level 3, resulting in a shift of one sub-band at level 3, so that the shifted sub-band is the fifth level 3 sub-band 84. This change is represented in FIG. 4 by a flip indicated by the circle 96, and by the shift indicated by the arrow 98.

The level 3 sub-band 85 therefore occupies one eighth of the total bandwidth, specifically the upper half of the third quarter of the available sub-channels. After the mathematical flip, or shift, operation, there is defined a new sub-band, again occupying one eighth of the total bandwidth, specifically now the lower half of the third quarter of the available sub-channels.

FIG. 4 also shows a situation of the seventh level 3 sub-band 86. The flip operation therefore acts on level 3, resulting in a shift of one sub-band at level 3, so that the shifted sub-band is the eighth level 3 sub-band 87. This change is represented in FIG. 4 by a flip indicated by the circle 100, and by the shift indicated by the arrow 102.

The level 3 sub-band 86 therefore occupies one eighth of the total bandwidth, specifically the lower half of the fourth quarter of the available sub-channels. After the mathematical flip, or shift, operation, there is defined a new sub-band, again occupying one eighth of the total bandwidth, specifically now the upper half of the fourth quarter of the available sub-channels.

Once the other sub-band has been allocated to the user, as a result of this operation, a hopping sequence is defined. In particular, a sub-band (level k) hopping sequence $F^{(k)}(t), t=1, 2, 3, K$ for a connection is formed by assigning the connection the following set of parameters:

- two sub-bands $\{f_j^{(k)}, f_j^{(k)}\}$ where (e.g.) the first one is used as initial value;
- a binary sequence (e.g. pseudorandom) $x(t), t=1, 2, 3, K$ where t is the time index of the hopping.

Unless otherwise stated, it is assumed that the assigned sub-bands for hopping by a connection are different, i.e. $i \neq j$ (otherwise we have the trivial case without hopping).

The hopping sequence, in terms of flipping, is then constructed by:

$$F^{(k)}(t) = \sigma_z^{x(t)} F^{(k)}(t-1) \quad (1)$$

$$F^{(k)}(0) = f_j^{(k)} \quad (2)$$

and where the level of the flip, z, is given by $$z = k - \log_2 |j - i|. \quad (3)$$

In terms of shifting, the hopping sequence is given by:

$$F^{(k)}(t) = F^{(k)}(t-1) + x(t) \cdot \theta_z^{(k)}(F^{(k)}(t-1)) \quad (4)$$

$$F^{(k)}(0) = f_j^{(k)}. \quad (5)$$

Note that this imposes a restriction of the pairs of sub-bands that may be assigned. It is required that $\log_2 |j-i|$ it is an integer, or equivalently that the magnitude of the shift $|j-i|$ it is an integer power of 2.

Alternatively but equivalently, a connection is assigned a hopping sequence by

- an initial sub-band value $f_j^{(k)}$;
- a flip $\sigma_z$ acting on level z, $1 \leq z \leq k$, or a shift $\theta_j^{(k)}$ with magnitude $2^{k-z}$;
- a binary sequence (e.g. pseudorandom) $x(t), t=1, 2, 3, K$ where t is the time index of the hopping.

It is also possible to use a combined flip operator, that can be used in exactly the same way as the basic single-level flipping in the preceding section, by combining two or more basic flip operators operating at different levels, e.g.

$$\sigma_{ij} = \sigma_i \sigma_j.$$

This should be interpreted as $$\sigma_{ij} f_l^{(k)} = \sigma_i (\sigma_j f_l^{(k)}).$$

Note that $\sigma_{ij} = \sigma_{ji}$ and that the necessary property $\sigma_{ij}^2 = 1$ holds.

The corresponding combined sub-band shift is given by $$\theta i_{ij}^{(k)} = \theta i_i^{(k)} + \theta i_j^{(k)}.$$

This should be interpreted as the shift from sub-band l on level k to sub-band $$l + \theta i_{ij}^{(k)} = l + \theta i_i^{(k)}(l) + \theta i_j^{(k)}(l).$$

This can be generalized to combined flipping on any number of levels. Note that flipping must occur simultaneously on all levels where flipping is applied.

As illustrated above, the different users, or connections, have different bandwidth requirements and so the bandwidth allocations are variable. This has the result that sub-band allocation and sub-band hopping have to be done at different levels of the sub-band tree in order to ensure unfragmented sub-bands; provide sub-band hopping at various levels; maintain sub-band hopping restrictions, i.e. at most 2 sub-bands per connection; and avoid collisions.

These requirements can be met by allocating disjoint resources from the same sub-band tree; applying the same flip (or no flip) at a certain level for all connections that are affected by this flip, i.e. connections sharing the same sub-branch in the sub-band tree for which the flip is applied. It should also be noted that, if flipping is applied at more than one level along a branch, flipping must be applied simultaneously at all levels.

This has the result that only one binary sequence is needed for a connection to generate flips (or shifts) on the various levels in case of combined flipping.

The examples given so far assume that a connection, or a user, has a bandwidth requirement that is an exact binary fraction (i.e. $\frac{1}{2^a}$, where a is an integer) of the available bandwidth. A connection requesting n, where $2^{k-1} < n < 2^k$, sub-band units (i.e. where a sub-band unit is the smallest sub-band into which the sub-channels have been divided) can be treated as a connection requesting $2^k$ sub-band units with respect to sub-band hopping assignment.

The invention has been described so far with reference to binary splitting of the available sub-bands, and flipping using an operator that returns to the original sub-band after two applications, and hence the generation of hopping sequences that contain two sub-bands. However, this can be generalized to allow hopping on more than 2 sub-bands in a similar way by n-state flipping.

In this case, we can assume that the available bandwidth has a n-ary splitting into equally sized sub-bands. At level k=1, the carrier is split into n sub-bands. At an arbitrary level k, the carrier is split into $n^k$ sub-bands, each numbered as $0, 1, \ldots, n^k - 1$. Let sub-band j at level k be denoted by the representation:

$$f_j^{(k)} b_1 b_2 K b_k$$

so that $b_1 n^{k-1} + b_2 n^{k-2} + K + b_{k-1} n^1 + b_k = j$
and where $b_i \in \{0, 1, K, n-1\}$.

Now, we introduce the basic "flip" operator $\sigma_i$, acting on level i, by $$\sigma_i f_j^{(k)} = f_j^{(k)} \oplus 1_i^{(k)}$$

in which $\oplus$ denotes bitwise addition modulo n and where $1_j^{(k)} := n^{k-i}$.

For example:
With n=3 and $f_{25}^{(4)} = 0221$ we get:

$$\sigma_3 f_{25}^{(4)} = 0221 \oplus 0010 = 0201 = f_{19}^{(4)},$$

i.e. a shift from sub-band 25 to 19.
The next flip yields:

$$\sigma_3 f_{19}^{(4)} = 201 \oplus 0010 = 0211 = f_{22}^{(4)},$$

i.e. a shift from sub-band 19 to 22.

The third flip results in the original sub-band.

Note that repeated flip operation retrieves the original sub-band, i.e.

$\sigma_i'' := \sigma_i \Lambda \sigma_i = I$ where I is the identity operator

A connection is assigned a hopping sequence in this case by:

an initial sub-band value $f_i^{(k)}$;

a flip $\sigma_z$ acting on level z, $1 \leq z \leq k$;

an n-ary sequence (e.g. pseudorandom) $x(t) \in \{0, 1, K, n-1\}, t=1, 2, 3, K$ where t is the time index of the hopping.

The hopping sequence, in terms of flipping, is then constructed by $$F^{(k)}(t) = \sigma_z^{x(t)} F^{(k)}(t-1) \quad (6)$$

$$F^{(k)}(0) = f_i^{(k)} \quad (7)$$

As described so far, there is provided a system in which the available bandwidth is divided in a predetermined way, and this is suitable for many applications. However, in other situations, it may be desirable to allow an adaptive allocation of the available frequency resources.

Figure 5:
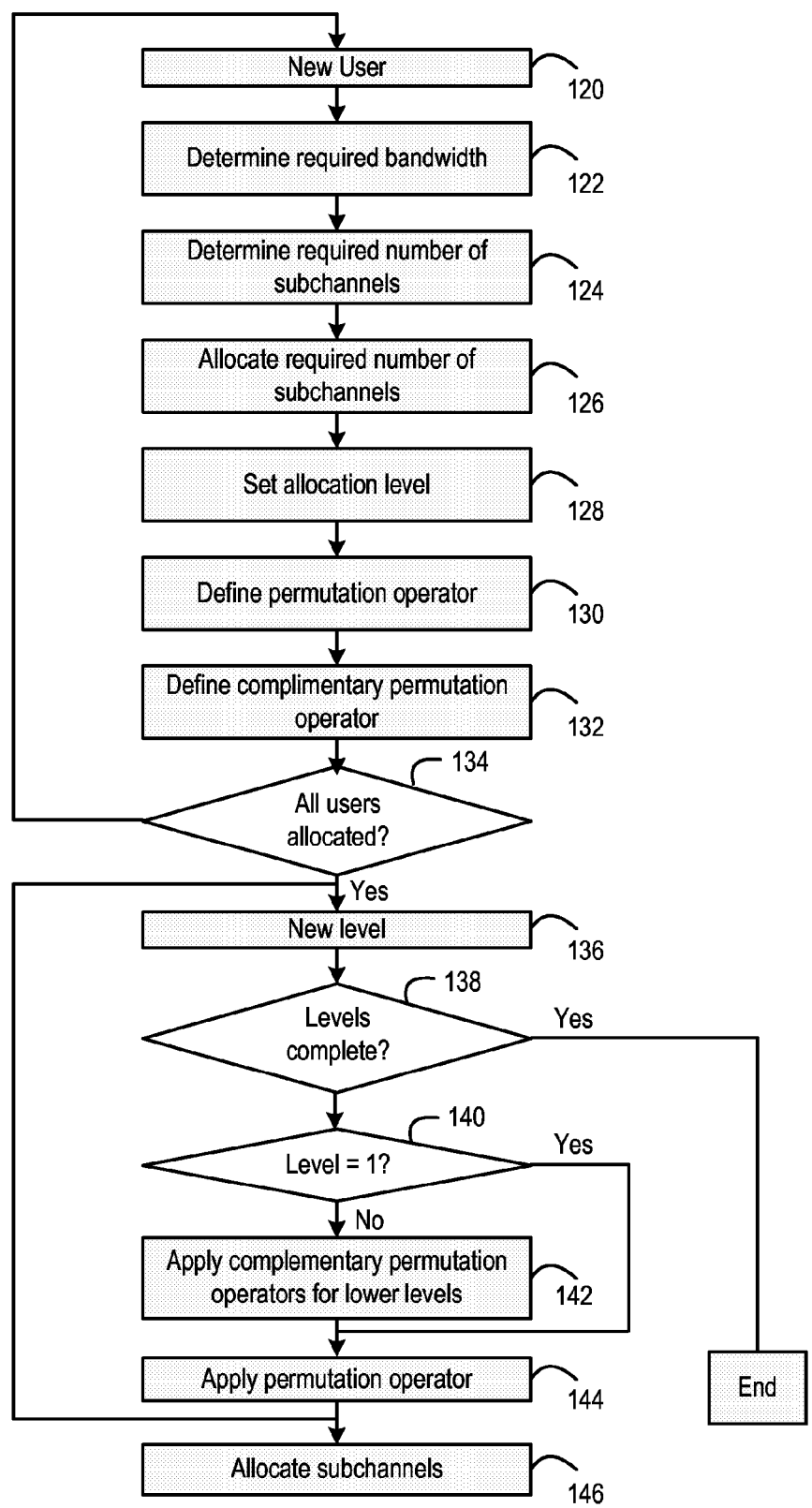
FIG. 5 is a flow chart, illustrating a further method in accordance with an aspect of the present invention.

FIG. 5 is a flow chart, illustrating a further method in accordance with an aspect of the present invention.

Specifically, FIG. 5 illustrates the procedure performed when a new user requires a bandwidth allocation for communicating in the wireless network.

In step 120, a new user registers with the system, and in step 122 it is determined in one of the network nodes what bandwidth is required by that user. As before, the allocation of sub-channels can be performed in any network node. The information about the allocated sub-channels, and the frequency hopping sequence, can be performed in that network node, and then informed to the other network node or nodes involved in the connection by means of a relatively short information-carrying message.

This embodiment of the invention will be described with reference to a situation in which there are 31 sub-channels available for allocation to the users.

In step 124, the required bandwidth is used to determine how many of the available sub-channels should be allocated to that user and, in step 126, the required number of sub-channels is allocated for a first time period, t. In this illustrated embodiment, a group of consecutive sub-channels is allocated to the user, either starting at the first (lowest numbered) of said frequency sub-channels that have not previously been allocated to another user, or ending at the last (highest numbered) of said frequency sub-channels that have not previously been allocated to another user.

In step 128, an allocation level is set for that user. In one embodiment of the invention, the allocation levels can be applied simply in numerical order. Thus, the first user is given allocation level 1, the second user is given allocation level 2, and so on, with each new user being given an allocation level that is greater by 1 than the number of already allocated users.

However, in another embodiment, a new user is given an allocation level that is greater by 1 than the number of already allocated users, only if the bandwidth allocated to the new user is smaller than the bandwidth allocated to any other user. If, in fact, there is one or more of the already allocated users with a smaller bandwidth allocation than the new user, then the new user is given the allocation level of that already allocated user, and the allocation level of each of the already allocated users is increased by 1. In yet another embodiment of the invention, if there is one or more of the already allocated users with a smaller bandwidth allocation than the new user or the same bandwidth allocation as the new user, then the new user is given the allocation level of that already allocated user, and the allocation level of each of the already allocated users is increased by 1.

In step 130, a permutation operator is defined for the user and, in step 132, a complementary permutation operator is defined, as will be described in more detail below. The process passes to step 134, in which it is determined if all users have been dealt with. If not, the process returns to step 120 but, if so, the process passes to step 136.

Figure 6:
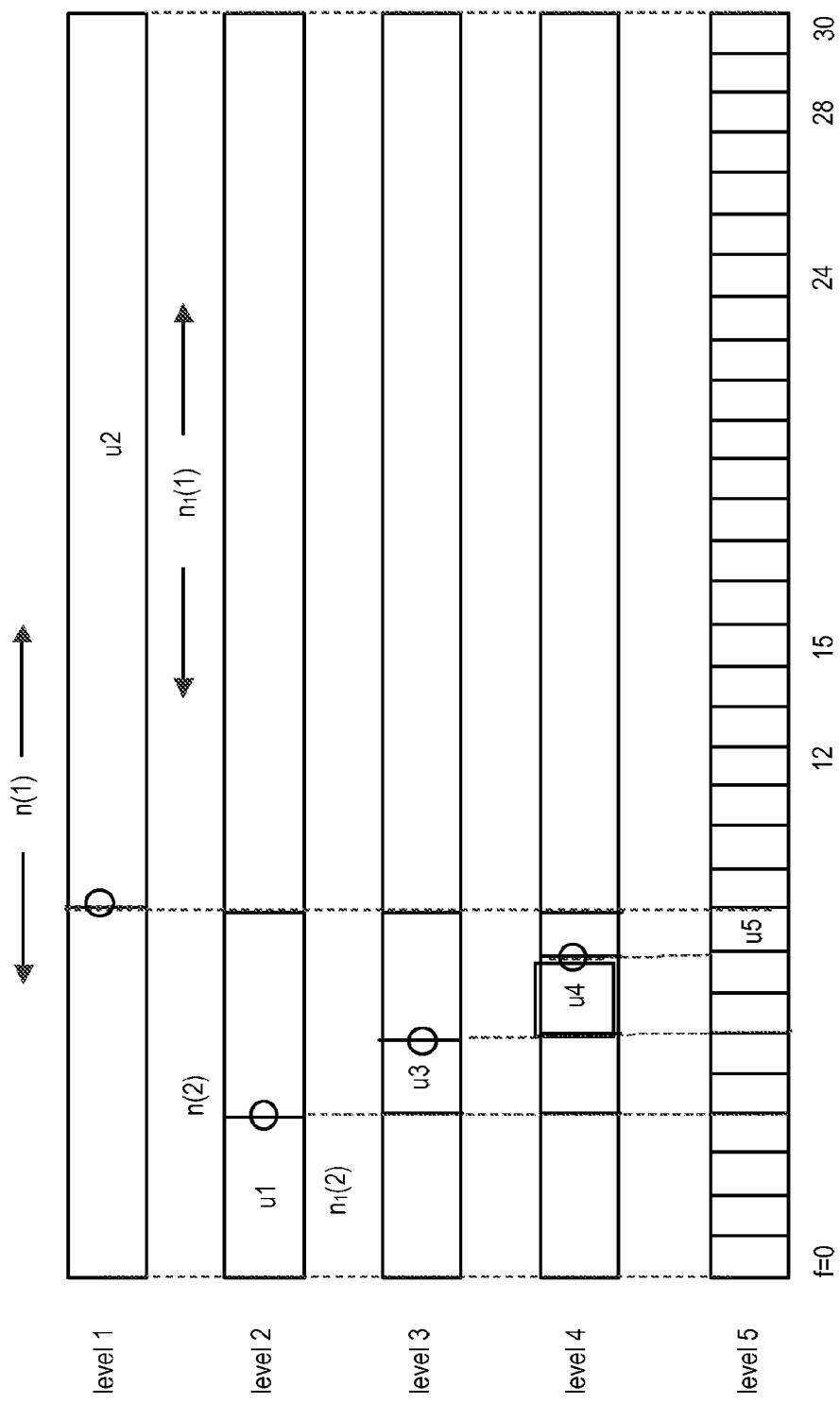
FIG. 6 illustrates an allocation of frequency sub-channels to users at a first time period, using the method of FIG. 5.

FIG. 6 shows the sub-channel allocation for a time t for one exemplary situation where there are 31 sub-channels, numbered 0, 1, 2, ..., 30, and there are five users, arriving in the order u1, u2, u3, u4, u5.

The first user, u1, requires 4 sub-channels, and is allocated the sub-channels starting at the lowest numbered available sub-channel (that is, sub-channel 0), and is therefore allocated sub-channels 0, 1, 2, 3. The first user is also given allocation level 1.

The second user, u2, requires 22 sub-channels, and is allocated the sub-channels ending at the highest numbered available sub-channel (that is, sub-channel 30), and is therefore allocated sub-channels 9, 10, 11, ..., 30. As the second user has a larger bandwidth allocation than the first user, the second user is now given allocation level 1, while the first user is reallocated to allocation level 2.

The third user, u3, requires 2 sub-channels, and is allocated the sub-channels starting at the lowest numbered available sub-channel (that is, sub-channel 4), and is therefore allocated sub-channels 4 and 5. The third user is also given allocation level 3.

The fourth user, u4, requires 2 sub-channels, and is allocated sub-channels 4, 5. In this embodiment, a new user is given an allocation level that has previously been given to another user, only if the new user has a larger bandwidth allocation than that previous user (and not if the new user has the same bandwidth allocation as the previous user), and so the fourth user is now given allocation level 4.

The fifth user, u5, requires 1 sub-channel, and is allocated the remaining sub-channel, namely sub-channel 8. The fifth user is also given allocation level 5.

In steps 130 and 132, a permutation operator and a complementary permutation operator are defined for the user.

The effect of the permutation operator is that, for each user, when the allocated group of consecutive sub-channels starts at the lowest numbered of said frequency sub-channels that have not been allocated to another user at a lower allocation level, the sub-channel number of each of said sub-channels is increased by a first number such that the group ends at the highest numbered of said frequency sub-channels that have not previously been allocated to another user at a lower allocation level. When the allocated group of consecutive sub-channels ends at the highest numbered of said frequency sub-channels that have not previously been allocated to another user at a lower allocation level, the sub-channel number of each of said sub-channels is decreased by the first number such that the group starts at the lowest numbered of said frequency sub-channels that have not been allocated to another user at a lower allocation level.

The effect of the complementary permutation operator is that, for each user, when the non-allocated group of consecutive sub-channels starts at the lowest numbered of said frequency sub-channels that have not previously been allocated to another user at a lower allocation level, the sub-channel number of each of said sub-channels is increased a by a second number such that the group ends at the highest numbered of said frequency sub-channels that have not previously been allocated to another user at a lower allocation level. When the non-allocated group of consecutive sub-channels ends at the highest numbered of said frequency sub-channels that have not previously been allocated to another user at a lower allocation level, the sub-channel number of each of said sub-channels is decreased by the second number such that the group starts at the lowest numbered of said frequency sub-channels that have not previously been allocated to another user at a lower allocation level.

Thus, in the case illustrated in FIG. 6, at the first allocation level, the permutation operator decreases the sub-channel number by 9, while the complementary permutation operator increases the sub-channel number by 22. At the second allocation level, the permutation operator increases the sub-channel number by 5, while the complementary permutation operator decreases the sub-channel number by 4. At the third allocation level, the permutation operator increases the sub-channel number by 3, while the complementary permutation operator decreases the sub-channel number by 2. At the fourth allocation level, the permutation operator increases the sub-channel number by 1, while the complementary permutation operator decreases the sub-channel number by 2. Since all of the sub-channels are allocated at the fifth allocation level, no permutation is possible.

The permutation operators and complementary permutation operators can be expressed mathematically, as follows. In this explanation, the sub-channels in the frequency band are indexed as 0, 1, 2, . . . corresponding to the increasing sequence of physical sub-channel frequencies (although these indices could equally apply to the decreasing sequence of physical sub-channel frequencies), and each user is associated with an allocation level in the allocation tree (as shown in FIG. 6).

At allocation level k, there are n(k) available sub-channels, with $F_0(k)$ being the lowest index of the available sub-channels. Of those available sub-channels, a sub-band of $n_1(k)$ sub-channels is allocated. If this sub-band starts at the lowest numbered of said available sub-channels, it includes the sub-channels $F_0(k)$ to $(F_0(k)+1)$. If the sub-band ends at the highest numbered of said available sub-channels, it includes the sub-channels $(F_0(k)+n(k)-n_1(k))$ to $(F_0(k)+n(k)-1)$.

If $f_1$ is the index of one of the allocated sub-channels, and $f'_1$ is the index of one of the remaining non-allocated sub-channels, then the permutation operator $\sigma_k$ operating in the allocated sub-band, and the complementary permutation operator $\sigma'_k$ operating in the non-allocated sub-band are defined as follows:

If $n_1(k) \leq n(k)-n_1(k)$:

$$\left. \begin{array}{l} f_2 := \sigma_k f_1 = f_1 + n(k) - n_1(k) \\ f'_2 := \sigma'_k f'_1 = f'_1 - n_1(k) \end{array} \right\} \text{ if } f_1 - F_0(k) < n_1(k)$$

$$\left. \begin{array}{l} f_2 := \sigma_k f_1 = f_1 - (n(k) - n_1(k)) \\ f'_2 := \sigma'_k f'_1 = f'_1 + n_1(k) \end{array} \right\} \text{ if } f_1 - F_0(k) \geq n(k) - n_1(k)$$

If $n_1(k) > n(k)-n_1(k)$:

$$\left. \begin{array}{l} f_2 := \sigma_k f_1 = f_1 + n(k) - n_1(k) \\ f'_2 := \sigma'_k f'_1 = f'_1 - n_1(k) \end{array} \right\} \text{ if } f'_1 - F_0(k) \geq n_1(k)$$

$$\left. \begin{array}{l} f_2 := \sigma_k f_1 = f_1 - (n(k) - n_1(k)) \\ f'_2 := \sigma'_k f'_1 = f'_1 + n_1(k) \end{array} \right\} \text{ if } f'_1 - F_0(k) < n(k) - n_1(k)$$

The process then determines a second sub-channel allocation, by using the permutation operators and the complementary permutation operators.

In step 136, a new allocation level is considered, starting at allocation level 1 and, in step 138, it is determined whether all of the levels have been considered. Assuming that there are levels still to consider, the process passes to step 140, in which it is determined whether the current allocation level is allocation level 1. If so, step 142 is omitted but, otherwise, the process passes to step 142.

In step 142, the complementary permutation operator for each preceding level is applied to the sub-channel numbers allocated to the user having the current allocation level.

The process then passes to step 144, in which the permutation operator for the current allocation level is applied to the sub-channel numbers allocated to the user at that allocation level.

After applying the permutation operator, the process passes to step 136, for consideration of a different allocation level.

Thus, at allocation level 1, the permutation operator for allocation level 1 is applied, decreasing each sub-channel number by 9. Thus, sub-channel numbers 9, 10, 11, . . . , 30 are permuted to sub-channel numbers 0, 1, 2, . . . , 21.

At allocation level 2, the complementary permutation operator for allocation level 1 is applied, increasing each sub-channel number by 22, and then the permutation operator for allocation level 2 is applied, increasing each sub-channel number by 5. Thus, sub-channel numbers 0, 1, 2, 3 are permuted to sub-channel numbers 28, 29, 30, 31.

At allocation level 3, the complementary permutation operators for allocation levels 1 and 2 are applied, increasing each sub-channel number by 22, and then decreasing each sub-channel number by 4, and then the permutation operator for allocation level 3 is applied, increasing each sub-channel number by 3. Thus, sub-channel numbers 4, 5 are permuted to sub-channel numbers 25, 26.

At allocation level 4, the complementary permutation operators for allocation levels 1, 2 and 3 are applied, increasing each sub-channel number by 22, and then decreasing each sub-channel number by 4, and decreasing each sub-channel number by 2, and then the permutation operator for allocation level 4 is applied, increasing each sub-channel number by 1. Thus, sub-channel numbers 6, 7 are permuted to sub-channel numbers 23, 24.

At allocation level 5, the complementary permutation operators for allocation levels 1, 2 3 and 4 are applied, although no permutation is possible, and so sub-channel number 8 is permuted to sub-channel number 22.

Figure 7:
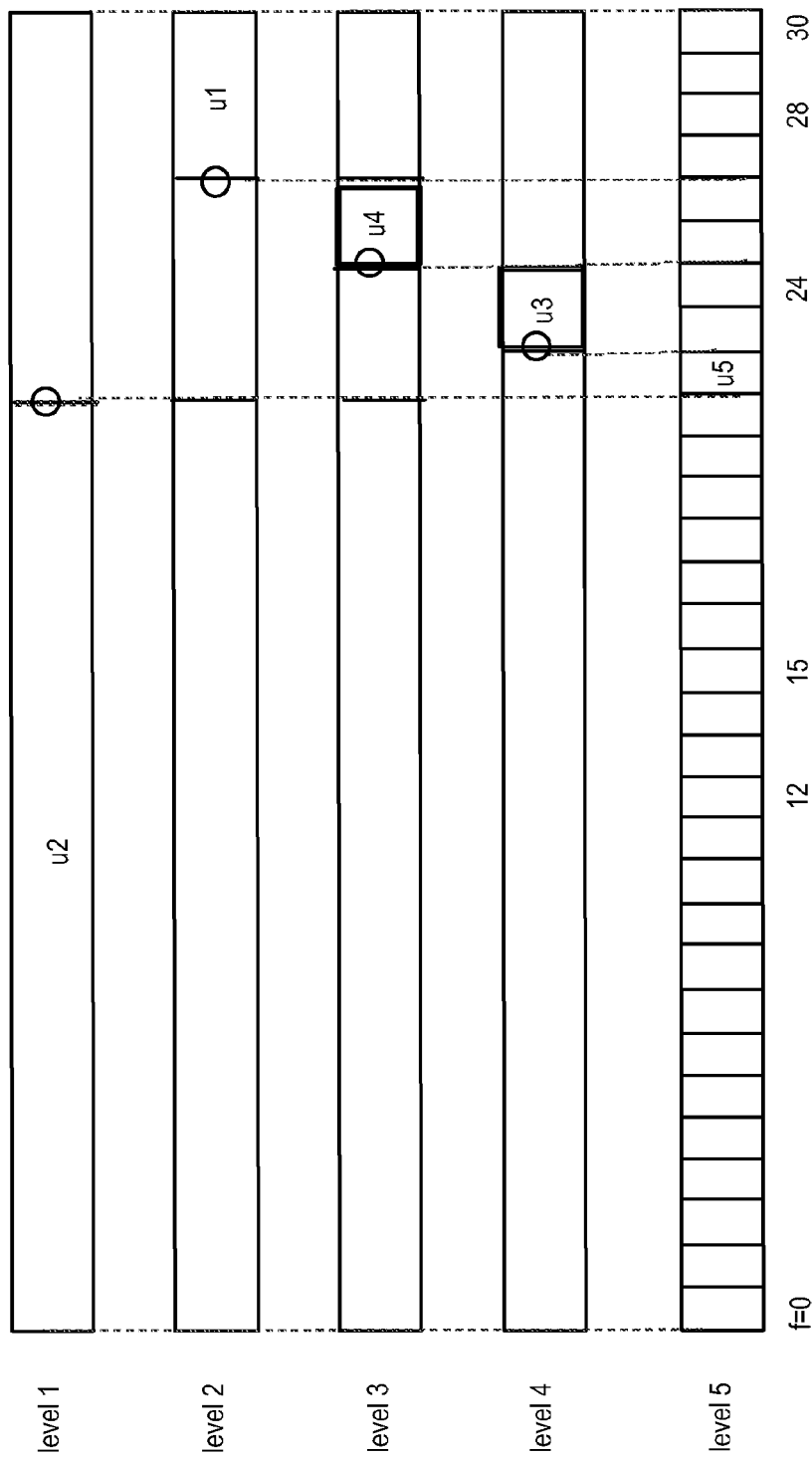
FIG. 7 illustrates an allocation of frequency sub-channels to users at a second time period, using the method of FIG. 5.

FIG. 7 illustrates this permuted allocation of frequency sub-channels to users, which can be used in one or more second time period.

There are thus defined two frequency allocations. In one embodiment of the invention, these two frequency allocations can be used during different time periods in a frequency hopping sequence. If the first allocation is represented by a binary "0", and the second is represented by a binary "1", then any multi-digit binary number can represent a frequency hopping sequence, with the bit values of the binary number indicating which of the frequency allocations should be used during successive time periods.

Figure 8:
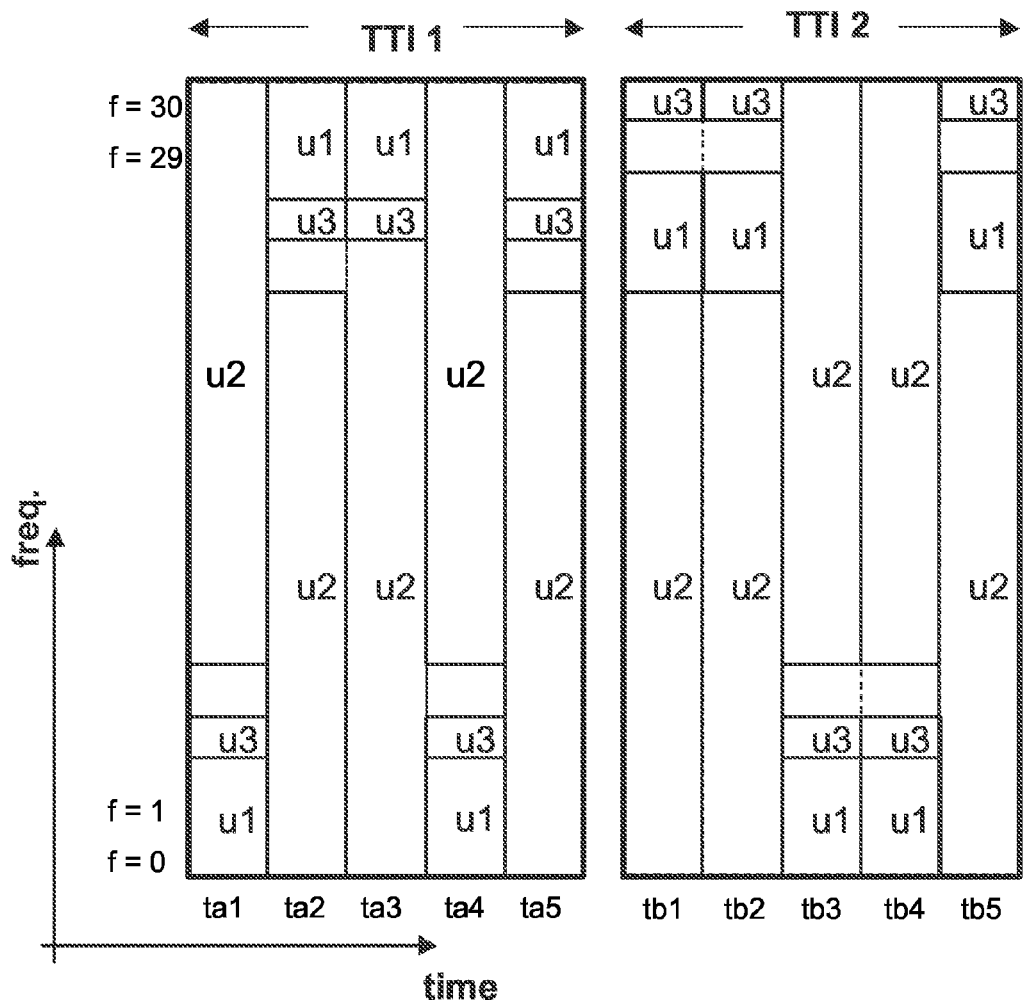
FIG. 8 illustrates the allocation of frequency sub-channels to users at a series of time periods.

FIG. 8 illustrates the frequency hopping operation. Thus, during a first time interval TTI1, including time periods ta1, ta2, . . . , ta5, the first allocation is using during time periods ta1 and ta4, while the second allocation is used during time periods ta2, ta3 and ta5, so this sequence can be represented by the binary number 01101, and this can be repeated as often as required.

It will be appreciated that other allocations can be defined according to the method set out above. For example, during a second time interval TTI2, including time periods tb1, tb2, ..., tb5, a different first allocation is using during time periods tb3 and tb4, while a corresponding different second allocation is used during time periods tb1, tb2 and tb5, so this sequence can be represented by the binary number 11001.

In further embodiments according to the present invention, once permutation operators have been determined on all levels, frequency hopping sequences can be constructed by, for each time step, either applying, or not applying, permutation operations on the various levels. Permutation operations may be applied independently on different levels, unless frequency hopping is constrained to a limited number of sub-bands per user. For n users there will be n levels in the frequency hopping tree. All possible combinations of applying or not applying permutations on the various levels yield up to $2^n$ different combinations of sub-band allocations available for the frequency hopping.

The frequency hopping sequences can be defined by specifying a binary sequence for each level (i.e. a total of n binary sequences), in which a binary digit indicates the operation to be performed (for example 0: no permutation or transition; 1: permutation, i.e. transition from "right" to "left" or "left" to right"). The frequency hopping sequence on level k is obtained by, for each time step, combining the permutations on levels 1 through k. Alternatively but equivalently, a binary sequence may indicate the state on level k (0: "left"; 1: "right") for each time step, rather than the event of permutation. The frequency hopping sequence on level k is then obtained by, for each time step, combining the states on levels 1 through k. Thus, a frequency hopping sequence can be specified as a sequence of binary vectors v1, v2, v3, ..., where each vector has n binary digits, each one corresponding to a level in the frequency hopping tree.

The important special case of constrained frequency hopping on at most N distinct sub-bands per user imposes restrictions. This means that of a total of $2^n$ combinations of available sub-band allocations in the frequency hopping tree consisting of n levels, at most N combinations may be used. If N equals 2 (as in the example), permutations on all levels (on which permutations are ever applied) must occur simultaneously. In this case, a binary frequency hopping sequence can be defined as a scalar binary sequence valid for all levels. The frequency hopping sequence is specified either as a binary sequence of transitions, or as a sequence of binary states.

In general, hopping sequences with constraints on number of sub-bands can be pre-defined and stored in the nodes involved in frequency hopping.

There is thus described a method for generating a single-carrier frequency sequence, in which the transmissions may hop over only a few of the available frequency sub-bands. The hopping patterns within a cell are orthogonal and offer frequency and interference diversity. The proposed scheme is further resource efficient since it facilitates that all time-frequency resources (in a cell) may be in use simultaneously.

The invention would be applicable e.g. in systems using variable bandwidth single-carrier transmission, like the proposed 3GPP LTE uplink access scheme.

The invention claimed is:

1. A method of wireless communication, operative in a communication system having an available frequency spectrum that is divided in a leveled way, such that, at a first level, the available bandwidth is divided into n disjoint bandwidth portions and, at each subsequent level, each portion from an immediately preceding level is divided into n disjoint bandwidth portions, the method comprising:
   allocating bandwidth comprising a number of consecutive sub-channels to a user such that:
      during a first group of n consecutive time periods, the user has access to a group of n respective different bandwidth portions from a predetermined level in a frequency hopping sequence, the predetermined level being determined by an amount of bandwidth required by said user; and
      during subsequent groups of n consecutive time periods, the user has access to the same group of n bandwidth portions from the predetermined level in the same frequency hopping sequence, wherein the frequency hopping sequence is constructed based on the amount of bandwidth required of said user, whereby sub-band allocation and sub-band hopping at a level is based on the amount of bandwidth required by the user.

2. The method of claim 1, wherein n=2.

3. The method of claim 1 wherein the step of allocating bandwidth to a user comprises:
   determining a bandwidth required by said user, and determining a number of sub-channels of the available bandwidth to be allocated to said user based an the required bandwidth;
   allocating a first sub-band to said user, the first sub-band including at least the determined number of consecutive sub-channels, by dividing the available sub-channels into a plurality of sub-bands at each of said levels, and allocating one of said sub-bands to the user at one of said levels, based on the required bandwidth;
   allocating at least one second sub-band to said user, the second sub-band including at least the determined number of consecutive sub-channels, by allocating to said user a different one of said sub-bands at said one of said levels; and
   defining a frequency hopping sequence including the first sub-band and the at least one second sub-band.

4. The method of claim 3 wherein the method steps are performed in a network node.

5. The method of claim 4 further comprising the step of transmitting a signal to at least one of said users, said signal identifying said respective groups of consecutive sub-channels for said user.

* * * * *